(12) United States Patent
Khaing Oo et al.

(10) Patent No.: US 11,692,941 B2
(45) Date of Patent: Jul. 4, 2023

(54) OPTOFLUIDIC DIAGNOSTICS SYSTEM

(71) Applicant: Optofluidic Bioassay, LLC, Ann Arbor, MI (US)

(72) Inventors: Maung Kyaw Khaing Oo, Ann Arbor, MI (US); Xudong Fan, Saline, MI (US)

(73) Assignee: Optofluidic Bioassay, LLC, Ann Arbor, MI (US)

( * ) Notice: Subject to any disclaimer, the term of this patent is extended or adjusted under 35 U.S.C. 154(b) by 0 days.

(21) Appl. No.: 17/509,806

(22) Filed: Oct. 25, 2021

(65) Prior Publication Data
US 2022/0042919 A1    Feb. 10, 2022

Related U.S. Application Data

(63) Continuation of application No. 16/489,420, filed as application No. PCT/US2018/021432 on Mar. 8, 2018, now Pat. No. 11,181,481.
(Continued)

(51) Int. Cl.
    *G01N 21/77*      (2006.01)
    *B01L 3/00*      (2006.01)
(Continued)

(52) U.S. Cl.
    CPC ............ *G01N 21/77* (2013.01); *B01L 3/5085* (2013.01); *G01N 21/78* (2013.01);
(Continued)

(58) Field of Classification Search
    CPC ..... B01L 2300/0663; B01L 2300/0809; B01L 2300/0829; B01L 2300/0832;
(Continued)

(56) References Cited

U.S. PATENT DOCUMENTS 5,306,510 A    4/1994    Meltzer
5,775,755 A    7/1998    Covert et al.
(Continued)

FOREIGN PATENT DOCUMENTS

JP      2013076642 A    4/2013
KR    20160136223 A    11/2016
(Continued)

OTHER PUBLICATIONS

Edwards, Alexander D. et al: "A simple device for multiplex ELISA made from melt-extruded plastic microcapillary film", Lab on a Chip, vol. 11, No. 24, Jan. 1, 2011 (Jan. 1, 2011), p. 4267, XP055226990, ISSN: 1473-0197, DOI: 10.1039/c0lc00357c.
(Continued)

*Primary Examiner* — Jennifer Wecker
*Assistant Examiner* — Jonathan Bortoli
(74) *Attorney, Agent, or Firm* — Endurance Law Group PLC

(57) ABSTRACT

An optofluidic diagnostic system and methods for rapid analyte detections. The system comprises an optofluidic sensor array, a test plate and an optical detection cartridge. The sensor array supports one or more distinct sensor units, each having a reactor section designed to temporarily enter a series of different kinds of wells in the test plate. One kind of well is a sample reservoir that holds reagent solution to be transferred into the reactor section. Another kind of well is a drainage chamber that removes reagent solution from the reactor section. A third kind of well is a colorant reservoir that holds a colorant reagent transferable into a reactor section. Finally, the sensor unit is transferred to the optical detection cartridge where it is placed into an isolation booth during the optical detection process so that its flat observation face is stationed in a viewing window opposite an optical detector lens.

10 Claims, 13 Drawing Sheets

Related U.S. Application Data

(60) Provisional application No. 62/468,762, filed on Mar. 8, 2017.

(51) Int. Cl.
    *G01N 21/78*      (2006.01)
    *G01N 21/76*      (2006.01)
    *G01N 21/75*      (2006.01)

(52) U.S. Cl.
CPC ............ *B01L 2300/0663* (2013.01); *B01L 2300/0809* (2013.01); *B01L 2300/0829* (2013.01); *B01L 2300/0832* (2013.01); *B01L 2300/0851* (2013.01); *B01L 2300/0858* (2013.01); *B01L 2300/168* (2013.01); *G01N 21/76* (2013.01); *G01N 2021/757* (2013.01); *G01N 2021/7786* (2013.01); *G01N 2201/0446* (2013.01)

(58) Field of Classification Search
CPC ..... B01L 2300/0851; B01L 2300/0858; B01L 2300/168; B01L 3/5085; G01N 2021/6482; G01N 2021/757; G01N 2021/7786; G01N 21/253; G01N 21/6452; G01N 21/76; G01N 21/77; G01N 21/78; G01N 2201/0221; G01N 2201/0446

See application file for complete search history.

(56) References Cited

U.S. PATENT DOCUMENTS

| | | | |
|---|---|---|---|
| 5,976,896 A | 11/1999 | Kumar et al. | |
| 6,006,800 A | 12/1999 | Nakano | |
| 6,143,252 A | 11/2000 | Haxo et al. | |
| 6,491,659 B1 | 12/2002 | Miyamoto | |
| 8,088,593 B2 | 1/2012 | Burd et al. | |
| 8,580,195 B2 | 11/2013 | Frey et al. | |
| 8,862,448 B2 | 10/2014 | Holmes et al. | |
| 9,056,291 B2 | 6/2015 | Battrell et al. | |
| 9,464,981 B2 | 10/2016 | Gibbons et al. | |
| 9,581,592 B2 | 2/2017 | Fan et al. | |
| 2002/0150944 A1 | 10/2002 | Hosoi | |
| 2006/0133965 A1 | 6/2006 | Tajima et al. | |
| 2006/0257992 A1* | 11/2006 | McDevitt | B01L 9/527 435/287.2 |
| 2007/0053797 A1 | 3/2007 | Muraishi et al. | |
| 2007/0237683 A1 | 10/2007 | Ho et al. | |
| 2008/0259449 A1* | 10/2008 | Fruhmann | G01C 3/08 359/425 |
| 2014/0322729 A1 | 10/2014 | Fan et al. | |
| 2015/0346097 A1 | 12/2015 | Battrell et al. | |
| 2016/0139010 A1 | 5/2016 | Heras et al. | |
| 2016/0334403 A1 | 11/2016 | Gibbons et al. | |

FOREIGN PATENT DOCUMENTS

| | | |
|---|---|---|
| WO | 2011117579 A1 | 9/2011 |
| WO | 2016077692 A1 | 5/2016 |

OTHER PUBLICATIONS

Funano Shun-Ichi et al: "Capillary-based enzyme-linked immunosorbent assay for highly sensitive detection of thrombin-cleaved osteopontin in plasma", Analytical Biochemistry, Academic Press, Amsterdam, NL, vol. 440, No. 2, Jun. 2, 2013 (Jun. 2, 2013), pp. 137-141, XP028689955, ISSN: 0003-2697, DOI: 10.1016/J.AB.2013.05.021.

Henares T G et al: "Single-step ELISA capillary sensor based on surface-bonded glucose oxidase, antibody, and physically-adsorbed PEG membrane containing peroxidase-labeled antibody", Sensors and Actuators B: Chemical, Elsevier BV, NL, vol. 149, No. 1, Aug. 6, 2010 (Aug. 6, 2010), pp. 319-324, XP027174100, ISSN: 0925-4005 [retrieved on Jun. 25, 2010].

\* cited by examiner

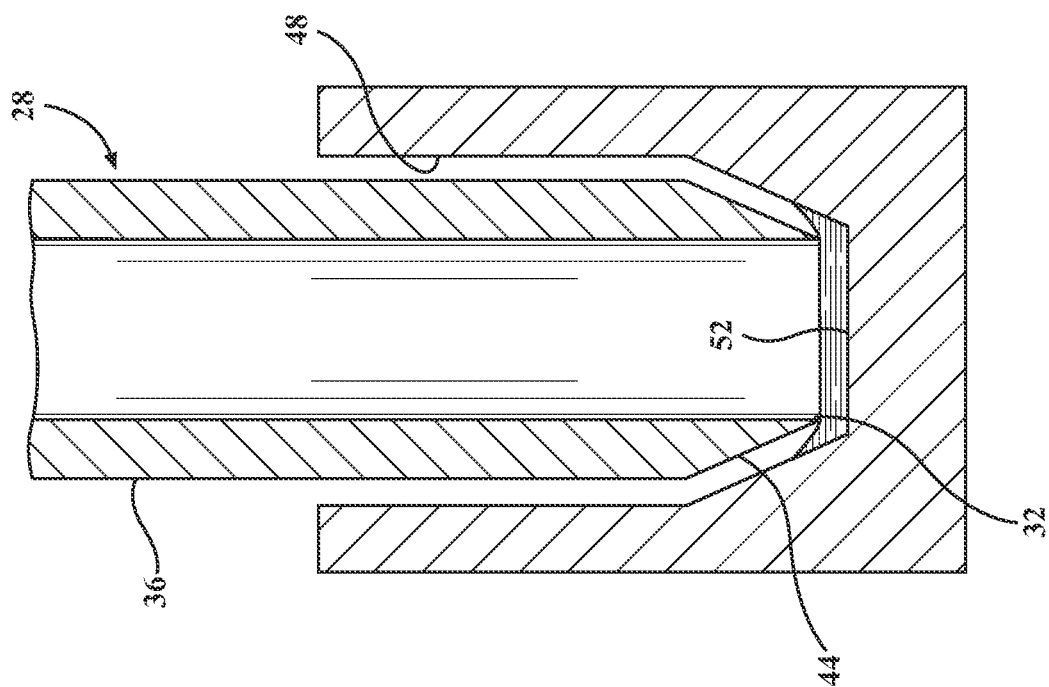
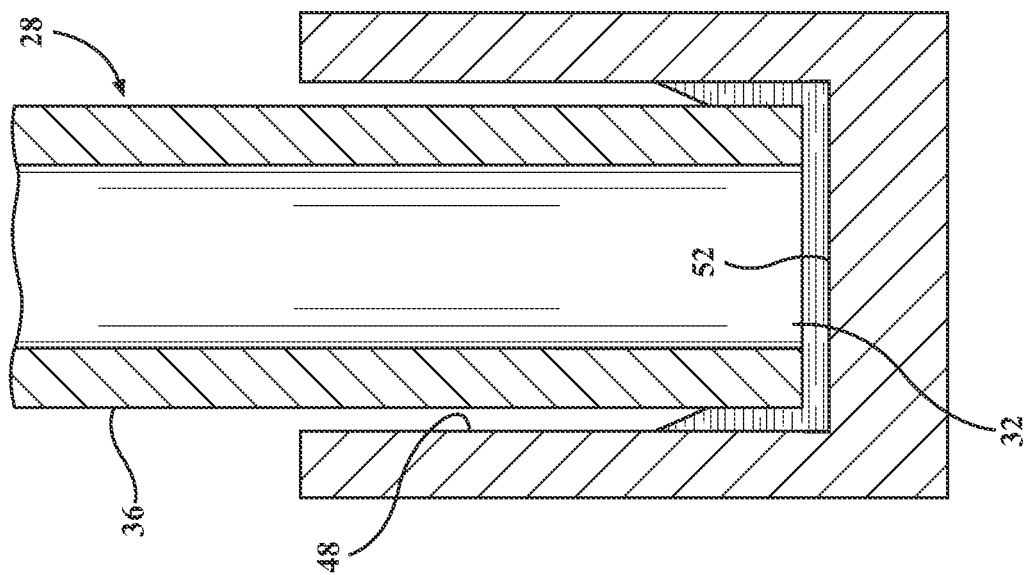

OPTOFLUIDIC DIAGNOSTICS SYSTEM

CROSS REFERENCE TO RELATED APPLICATIONS

This application is a Continuation of U.S. patent application Ser. No. 16/489,420, filed Aug. 28, 2019, which claims priority to International Patent Application No. PCT/US18/21432, filed on Mar. 8, 2018, which claims priority to Provisional Patent Application U.S. 62/468,762 filed on Mar. 8, 2017, the entire disclosures of which are hereby incorporated by reference and relied upon.

BACKGROUND OF THE INVENTION

Field of the Invention

The invention relates generally to measuring or testing systems and processes involving enzymes or microorganisms, and more particularly to improved sensors and well plates and optical detection features therefor.

Description of Related Art

Among various diagnostic tests, Enzyme-linked immunosorbent assay (ELISA) has been demonstrated to provide compelling and high performance quantitative and qualitative results. However, the current ELISA systems are generally ill-suited to deploy at point-of-care testing and other field applications due to such common drawbacks as: long testing time (3-6 hours+overnight coating); large sample and reagent consumption (50-100 µL per sensor well); and the requirement of bulky and expensive microplate readers. In order to achieve point of care viability, numerous performance advances are needed within the same ELISA detection scheme. In particular, improvements are needed to make an ELISA detection scheme rapid, affordable, portable and complete. Furthermore, an ELISA system well-suited to point-of-care applications needs to be compact enough for use in limited spaces, in emergency critical care sectors, as well as research and development laboratories and field applications.

Some prior art systems, such as that proposed in U.S. Pat. No. 8,088,593 assigned to Theranos, Inc. of Palo Alto, Calif., recognize the need for point-of-care diagnostic systems, but have failed to adequately optimize optical detection efficiency and continue to advocate bulky well plate designs.

There is therefore a need in the art for an improved diagnostic system, and components therefor, which will enable ELISA detection schemes that are rapid, affordable, portable, complete and that can be implemented in compact configurations suitable for limited spaces and field applications.

BRIEF SUMMARY OF THE INVENTION

According to a first aspect of this invention, a multi-well test plate for an optofluidic diagnostic system is configured to interact with at least one sensor unit moved sequentially into and out of registry therewith. The test plate comprises a plurality of wells. Each well has a well depth defined by an upper mouth and a lower base. Each well in the test plate has a generally equal well depth. At least three wells are arranged in a sequence cluster. At least one well in the sequence cluster comprises a sample reservoir dedicated to the containment of a liquid reagent. At least one well in the sequence cluster comprises a drainage chamber dedicated to the drainage of liquid reagents from a sensor unit. And at least one well in the sequence cluster comprises a colorant reservoir dedicated to the containment of a liquid color development reagent.

The test plate of this invention is less bulky by comparison to standard prior art well plates. The test plate can avoid the requirement to add reagents manually. The test plate is beneficial in improving analyte capture efficiency and allows for addition and withdrawal of analytes (solution) by either capillary force or induced pressure differential or a combination of both. The test plate is conducive to use of predefined and prepopulated reagents in the wells and provides efficient means for reagents/analytes delivery and draining. Furthermore, the test plate cooperates with an overall system that can be deployed at bedside of patients, doctors' offices, and in space-limited laboratories.

According to a second aspect of this invention, an optical detection cartridge is provided for an optofluidic diagnostic system. The optical detection cartridge comprises a plurality of isolation booths. Each isolation booth has a booth height defined by an open ceiling and a closed floor. Each isolation booth has an open viewport and optically-opaque sides. Each isolation booth is adapted to receive therein the reactor section of a sensor unit.

The optical detection cartridge makes optical cross-talk preventable among individual optofluidic sensor units, thus enabling improved accuracy in chemiluminescence or fluorescence detection schemes if desired. A optical detection cartridge is effective to increase the efficiency, sensitivity and effectiveness of optical detection, and directly facilitates high-throughput testing procedures.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 14 is an enlarged fragmentary view of the leading tip of the sensor unit of FIG. 12 disposed in a well having a complementary flat-shaped base;

FIG. 15 compares with FIG. 14 by showing an enlarged fragmentary view of the leading tip of the sensor unit of FIG. 13 disposed in a well having a complementary lofted cut base.

DETAILED DESCRIPTION OF THE INVENTION

Figure 1:
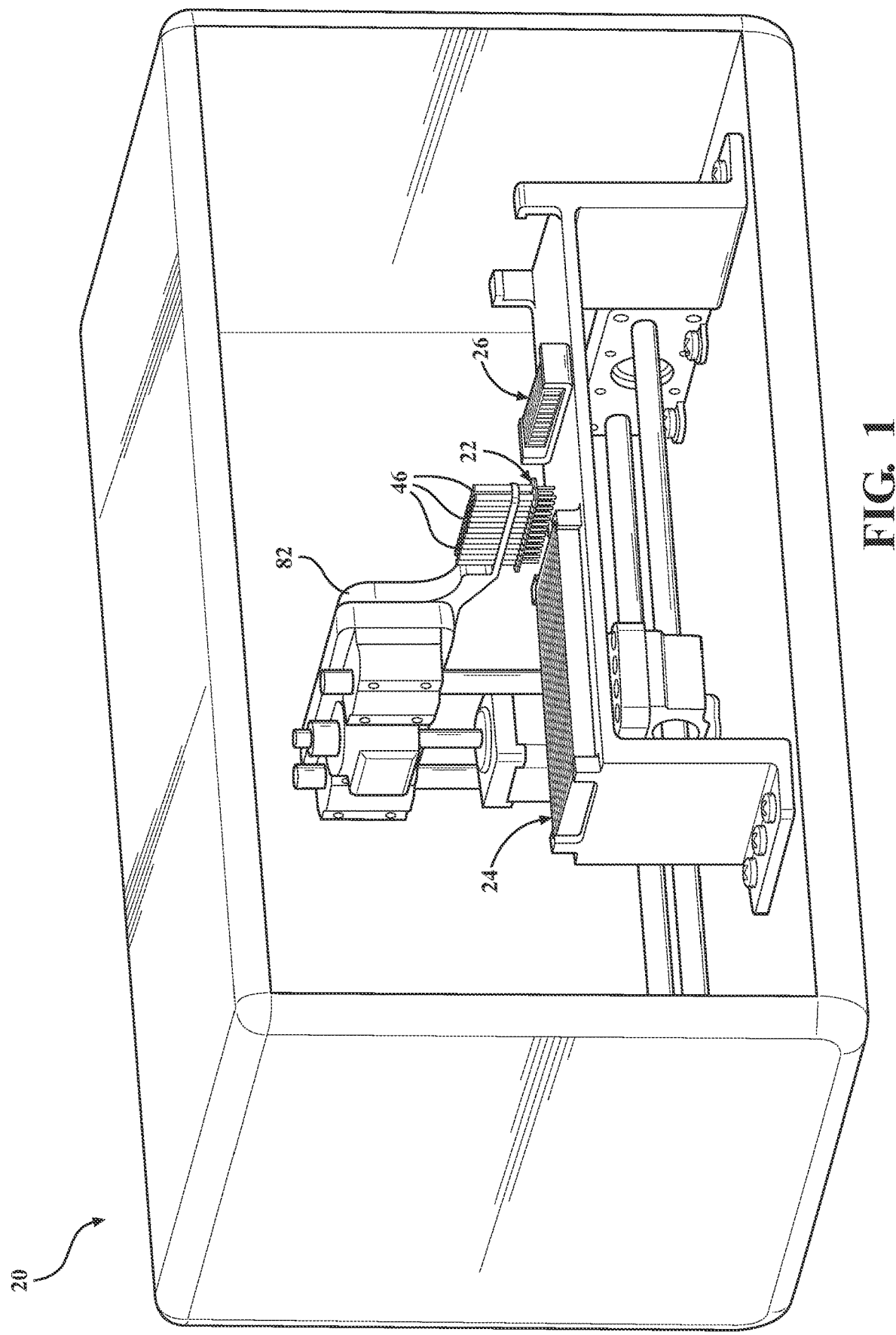
FIG. 1 shows a perspective view of a complete, miniature, automated optofluidic diagnostics system that comprises three main components: a sensor array; a test plate; an optical detection cartridge.

Referring to the figures, wherein like numerals indicate like or corresponding parts throughout the several views, an optofluidic diagnostic system according to one exemplary embodiment of the invention is generally shown at 20 in FIG. 1. The automated optofluidic diagnostic system 20 is designed for rapid biological and chemical analysis. Its many advantages include using less analyte and reagent solutions than the amount used in traditional protocol. Furthermore, the system 20 is able to perform high-throughput detections because of its capability to automatically load and unload the solutions.

Generally stated, the optofluidic diagnostic system 20 is composed of three primary parts or modules: a sensor array 22, a test plate 24 and an optical detection cartridge 26. Each module is independent of the other two modules, in the sense that each module is capable of stand-alone use independent of the unique attributes found in the other modules. However, all three of these modules find their greatest fulfillment when used in the combination which comprises the optofluidic diagnostic system 20.

Figure 2:
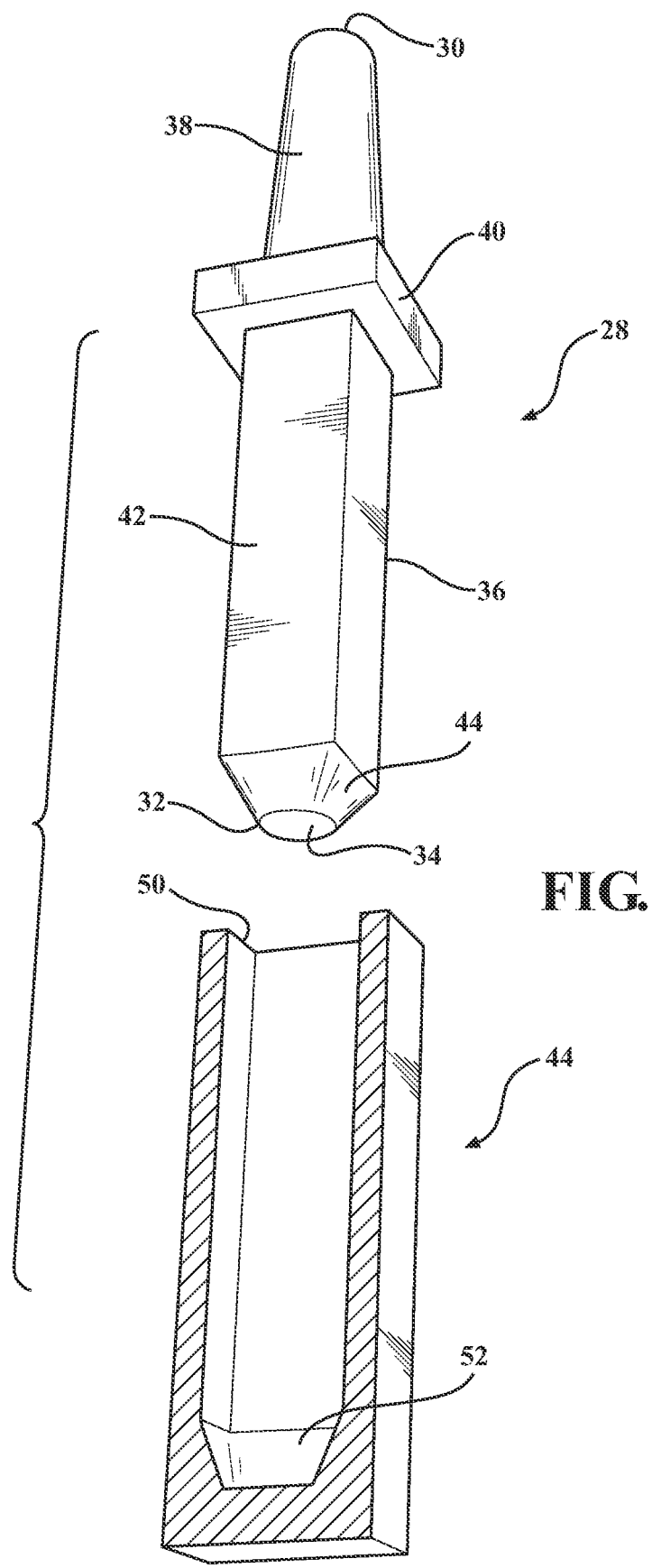
FIG. 2 is a simplified exploded view showing a single optofluidic sensor unit and a single mating well, according to one embodiment of this invention.
Figure 3:
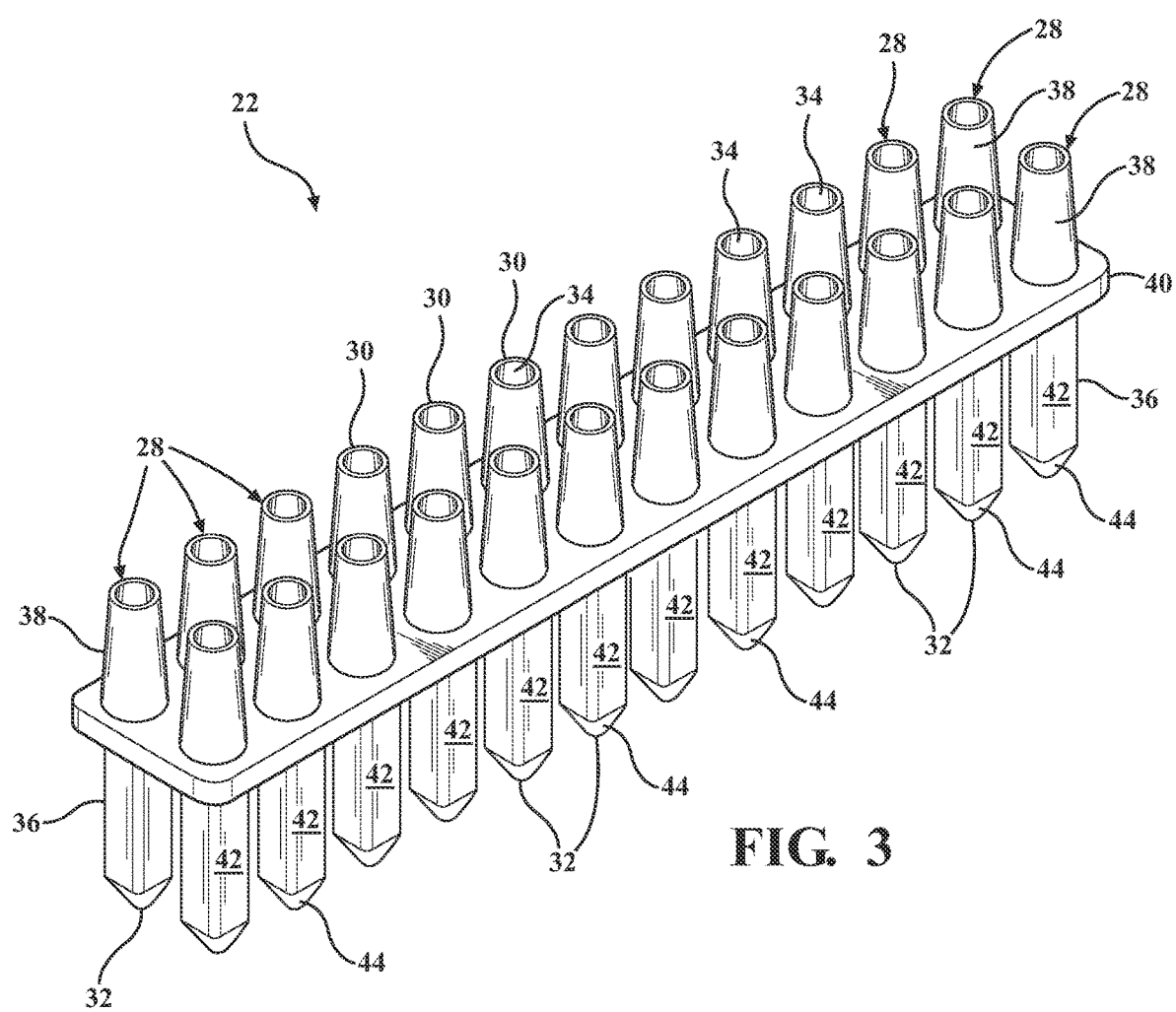
FIG. 3 is a perspective view of a sensor array according to an embodiment of this invention.

The sensor array 22 comprises a plurality of sensor units 28 arranged in formation. A single sensor unit 28 is shown in FIG. 2. The invention may be practiced using only a single sensor unit 28, as in FIG. 2, however greater efficiencies can be gained by multiplying the number of sensor units 28 into a monolithic array 22 like that shown in FIG. 3 so that multiple diagnostic tests can be conducted concurrently. The array 22 of FIG. 3 depicts an exemplary arrangement in which twenty-four sensor units 28 are joined in a formation of two columns, each column containing twelve sensor units 28. In an array 22 configuration, the distance between the center of one sensor unit 28 to the center of the next adjacent sensor unit 28 can be 0.002 to 0.354 inches or even greater.

From the vantage of FIG. 3, one of the columns of sensor units 28 can be described as the first or left-hand column and the other a second or right-hand column. In use, the first column trails the second column as the sensor array 22 is moved in hopping-like fashion through the sequential steps of a diagnostic test. That is, the second column is always a leading column. Although the array 22 is shown in several Figures as a 2×12 matrix, the actual number of sensor units 28 in an array 22 can be any desired number. Indeed, an array 22 may consist of only one column of any plural number of sensor units 28. Or in some cases, it might be desirable to construct a sensor array 22 having more three or more columns of sensor units 28. And to reiterate, a single sensor unit 28 operating solo can also be used to accomplish the methods of this invention without joining to other sensor units 28 into an array 22. Many configurations of one or more sensor units 28 are possible.

Each sensor unit 28 can be seen to extend between a top end 30 and a bottom end 32. The sensor units 28 are normally oriented in an upright posture so that its bottom end 32 is spaced vertically from its top end 30. Each sensor unit 28 has a dedicated fluid duct 34 that extends continuously therethrough from its top end 30 to its bottom end 32. The full length of the fluid duct 34 can be seen in the images of FIGS. 6A-D. Embodiments are contemplated where the fluid duct 34 is tapered and/or non-circular in cross-section. Preferably, however, the fluid duct 34 has a continuous cross-sectional area that is generally cylindrical, i.e., it has a constant circular cross-section along its entire length. In some contemplated embodiments of this invention, the internal diameter of the fluid duct 34 is between about 0.0003 and 0.06 inches. However, measurements outside this range are certainly possible. In fact, all dimensions and dimensional ranges provided throughout this description are mentioned for illustrative purposes only and are not to be construed as limiting the scope of the invention.

Returning to FIGS. 2 and 3, it can be seen that each sensor unit 28 includes a reactor section 36 adjacent its bottom end 32. In the illustrated examples, the reactor section 36 comprises the lower half (approximately) of the sensor unit 28. The upper half (approximately) of the sensor unit 28 comprises a coupler section 38. A frame 40 is disposed between each reactor section 36 and its associated coupler section 38. The frame 40 can serve as a mounting platform or feature in the case of a sensor unit 28 operating solo (FIG. 2). The frames 4 can also be a convenient point of attachment for integrally joining one sensor unit 28 to the next adjacent sensor unit 28 when forming a monolithic array 22 as in the example of FIG. 3.

The fluid duct 34 may include a reactive coating agent A that has been applied, i.e., immobilized, over at least a portion thereof within the reactor section 36. The reactive coating agent A can be any suitable diagnostic substance, including but not limited to, assays used to assess the presence, amount or functional activity of a target entity (i.e., the analyte). The reactive coating agent A contemplated for use in this invention specifically includes, but is not limited to, solid-phase enzyme immunoassays such as those used in typical ELISA test procedures. The reactive coating agent A may either be applied by a manufacturer, by an intermediate vendor, or by the end-user as a preparatory step prior to actual use in the system 20. It is also contemplated that the reactive coating agent A could be immobilized inside the fluid duct 34 using the system 20 of this invention but prior to the start of an actual diagnostic test.

The reactor section 36 may be partially or entirely fabricated from an optically transmissive material, including materials that can be characterized as fully transparent, semitransparent and/or translucent. More specifically, an optically transmissive material will be selected that has an index of refraction that closely approximates that of water or some other analyte liquid. By matching (or at least approximating) the index of refraction of the reactor section 36 with the refractive index of the liquid analyte to be used, light will pass from one to the other with minimal reflection or refraction losses. Two of the many suitable materials include glasses and plastics. The sensor units 28 can be manufactured by injection molding when a transparent plastic material (e.g., clear transparent polystyrene) is chosen.

The reactor section 36 has at least one planar observation face 42, at least a portion of which is fabricated from the optically transmissive material. That is to say, at the very least, the portion of the reactor section 36 that compromises the observation face 42 must have some optically-transmissive properties. In the illustrated examples, the entire reactor section including the observation face 42 is made from an optically-transmissive material. When the sensor unit 28 is ganged with other sensor units 28 into an array 22, the observation face 42 will face outwardly, i.e., in a direction away from all of the other sensor units 28 in the array 22. The reactor section 36 has a predetermined outer geometric shape that is preferably, but not necessarily, generally centered about the fluid duct 34. Contemplated geometric shapes include rectangles, triangles, hexagons and D-shapes to name a few. In the illustrated examples, the predetermined outer geometric shape of the reactor section 36 is generally square. The square shape produces four distinct flat exterior faces, one of which is the aforementioned observation face 42. In cases such as this where a sensor array 22 is composed of reactor sections 36 having more than one planar exterior face, the observation face 42 will be distinguished as the one facing away from the other sensor units 28, as shown in FIG. 3.

Preferably, but perhaps not necessarily, the observation face 42 is oriented vertically, and thus generally parallel to the fluid duct 34. In this manner, the cross-sectional thickness of optically transmissive material remains generally consistent along the length of the reactor section. In cases where the fluid duct 34 has a circular cross-section and extends parallel to the observation face 42, this configuration produces a generally plano-concave lens as shown by the cross-sections in FIGS. 9 and 10. A plano-concave lens will have beneficial divergent light-handling properties in cases where the refraction indexes between the material of the reactor section 36 and analyte solutions contained within the fluid duct 34 do not match.

The reactor section 36 has a leading tip 44 formed directly adjacent the bottom end 32 of the fluid duct 34. In the examples of FIGS. 2 and 3, the leading tip 44 is formed with a lofting square-to-round converging bended surface. In the example of FIGS. 6A-D, the leading tip 44 is formed as a flat truncated surface. Other shapes are contemplated, including but not limited to semi-spherical. Some specific advantages are attained when the leading tip 44 is formed with a square to circle tapered lofted blend tip, as explained below in connection with FIGS. 12-15.

The coupler section 38 of each sensor unit 28 is designed to connect with a supply of—positive or/and negative generator. The medium is described at various points below as being air, but other gasses and fluids could be used instead.

Figure 11:
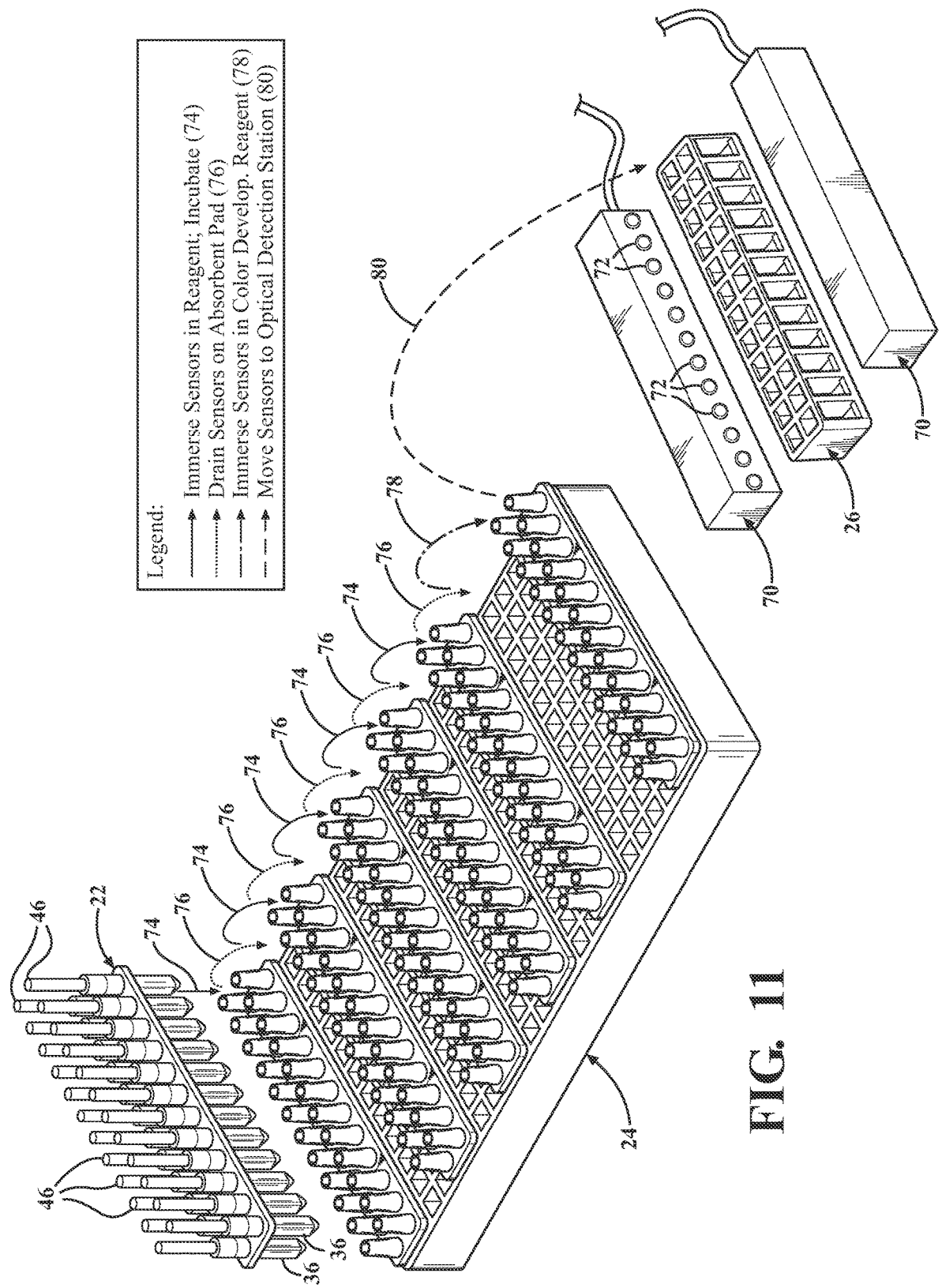
FIG. 11 is a view similar to FIG. 4 but including also the optical detection cartridge and optical detectors, with suggested relative movements between the components shown by directional arrows.

In the highly-simplified example of FIG. 11, individual feed tubes 46 are connected to the coupler sections 38 in a sensor array 22 configuration. Instead of the individual tubes 46, a manifold could be used to connect to the coupler sections 38. Or perhaps the atmosphere above the entire sensor array 22 could be controlled to cause pressure/vacuum fluctuations at the bottom ends 32 of the fluid ducts 34. For convenient connection to individual feed tubes 46 or a manifold (not shown), the coupler sections 38 may comprises a conically-tapered exterior surface that is centered about the fluid duct 34 to accomplish a friction fit. Of course, may other shapes and connection strategies may be used for the coupler section 38 to effectively connect with a supply of pressurized (positive and/or negative) air or other suitable fluid medium.

Each sensor unit 28 can thus be viewed as an open-ended tubular (i.e., hollow) structure whose fluid duct 34 is used as an inlet and outlet for reagents/analytes at a bottom end 32 thereof. Pressure differentials, if necessary, are introduced to the fluid duct 32 via its top end 30. The reactor and coupler sections 36, 38 are connected internally and smoothly via the internal fluid duct 34. The preferred outer shape of the tubular reactor section 36 is square, and the preferred outer shape of the coupler section 38 is tapered (frusto-conical) for easy insertion of connecting tubes 46 that link to the pressure differential device(s). Although these shapes can, of course, be modified to suit different applications and manufacturability. That is to say, other geometric shapes may be considered, including but not limited to oval, elliptical, triangular, hexagonal and octagonal tubular configurations to name but a few of the many possible forms.

Figure 4:
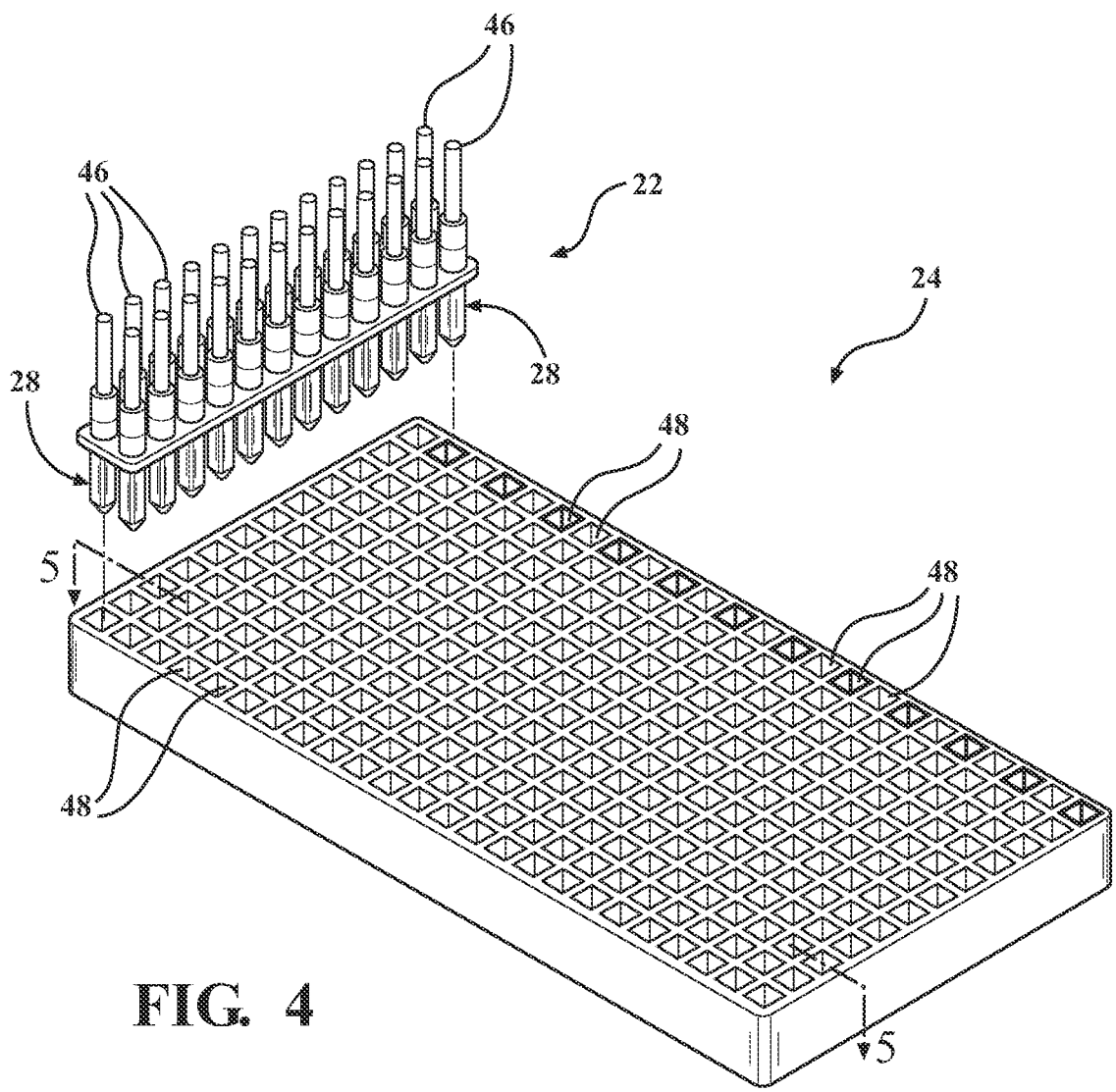
FIG. 4 a perspective view showing the sensor array of FIG. 3 poised above the first two columns of wells in a test plate according to an embodiment of this invention.

In the context of this optofluidic diagnostic system 20, each sensor unit 28 is configured for sequential movement into and out of registry with a plurality of discrete wells 48 in the test plate 24. In this manner, it can be said that the test plate 24 is adapted to receive the sensor array 22 in mating registry, as indicated by FIG. 4. However, unlike the wells of a traditional multi-well microplate (e.g., a Microtiter™ plate), it is not intended that any chemical reactions take place in any of the wells 48 of the test plate 24. Rather, in this present system, all chemical reactions of relevance will take place inside the rector sections 36 of the sensor units 28. Thus, the wells 48 may be seen more as holders or storage centers for various elements used in the process of conducting biological and/or chemical analysis inside the reactor sections 36.

Each well 48 is formed as a discrete comb-like cavity having a mouth 50 at its upper end and a closed base 52 at its lower end. The vertical distance between mouth 50 and base 52 is a well depth. In the illustrated examples, each well 48 in the test plate 24 has a generally equal well depth. However, since not all wells 48 have the same function or job, it is conceivable that the wells 48 could have different depths and/or different configurations for the base 52. The wells 48 each have a predetermined inner geometric shape that generally corresponds to the predetermined outer geometric shape of the reactor sections 36. In other words, if the outer cross-section of the reactor section 36 is square, then the inner cross-section of the well 48 is also square. This is perhaps best shown in FIG. 9 where a cross-section is taken through a well 48 with a reactor section 36 poised therein. Preferably a generous sliding fit clearance is maintained between the OD of the reactor sections 36 and the ID of the wells 48 so that the reactor sections 36 can be easily inserted into and withdrawn from the wells 48 along a vertical path during the several steps in a diagnostic process.

The test plate 24 in FIG. 4 is shown in the exemplary form having twelve rows corresponding to the number of rows of the sensor array 22. In this illustration, each row has a trajectory extending toward the lower right-hand corner of the image, whereas each column has a trajectory extending toward the lower left-hand corner of the image. In an X-Y coordinate system as viewed from above (e.g., FIG. 5), the rows may be said to extend in a horizontal X-direction and the columns in a vertical Y-direction. In most contemplated embodiments, the test plate 24 will have at least as many rows as the sensor array 22. The test plate 24 could easily have more rows than the sensor array 22, however it is unlikely that the test plate 24 will have fewer rows than the sensor array. The test plate 24 in FIG. 4 is shown in the exemplary form having twenty-four columns corresponding (or proportionally-corresponding) to the discrete steps needed to accomplish a diagnostic test. In this example, twelve discrete steps are possible. This is because the sensor array 22 shown here has two columns of sensor units 28. Thus, the twenty-four columns of the test plate 24 must be shared by the two columns of sensor units 28. (24÷2=12.) It will be understood that to complete a diagnostic analysis using the present system 20, the sensor units 28 are moved (relative to the test plate 24) along the rows of wells 48. Using the previously suggested X-Y coordinate system, it would be said that the sensor units 28 are moved (relative to the test plate 24) along the X-direction. A most efficient, but not exclusive, movement scenario is diagrammed in FIG. 11 where the sensor array 22 is sequenced along the test plate 24 in a straight line hopping fashion.

It may be helpful to think of the plurality of wells 48 as being arranged in respective sequence clusters. Each sensor unit 28 is associated with a respective one sequence cluster. Thus, in the examples of FIGS. 4 and 9, there are twenty-four sensor units 28 in the sensor array 22 so that the test plate 24 is configured to provide twenty-four distinct sequence clusters. Each reactor section 36 is constrained to interact with wells 48 in one designated sequence cluster. Or to say it another way, no reaction section 36 is permitted to stray outside its designated sequence cluster throughout the duration of a diagnostic test carried out with the system 20. Preferably, but perhaps not necessarily, the wells 48 in each sequence cluster will be arranged in a linear array or linear pattern. However, when the sensor array 22 has multiple columns of sensor units 28, the wells 48 in a sequence cluster will not be contiguous with one another.

To graphically illustrate, attention is directed to FIG. 4 were a select one of the twenty-four sequence clusters is indicated by bold edging around the mouths 50 of the corresponding wells 48. The indicated sequence cluster in FIG. 4 corresponds to the top-most sensor unit 28 in the second or right-hand column of the sensor array 22. (Every other well 48 in that same top row of the test plate 24 is associated with a different sequence cluster for the top-most sensor unit 28 in the first or left-hand column of the sensor array 22.) Throughout a diagnostic test, the reactor section 36 of the top-right sensor unit 28 will only descend into a well 48 of its designated sequence cluster. No other reactor section 36 in the array 22 will enter one of the wells 48 in the sequence cluster set aside for the top-right sensor unit 28. Thus, the relationship between a sensor unit 28 and its designated sequence cluster is exclusive throughout a diagnostic test, to avoid contamination.

Generally stated, the number of sequence clusters in each row of the test plate 24 will correspond to the number of columns of sensor units 28 in a sensor array 22. If a sensor array 22 has only one column of sensor units 28 (and when a solitary sensor unit 28 is operating solo), a row of wells 48 may contain only one active sequence cluster. Or alternatively, if a sensor array 22 were to have four columns of sensor units 28, a row of wells 48 must contain at least four distinct sequence clusters. And so forth.

Figure 5:
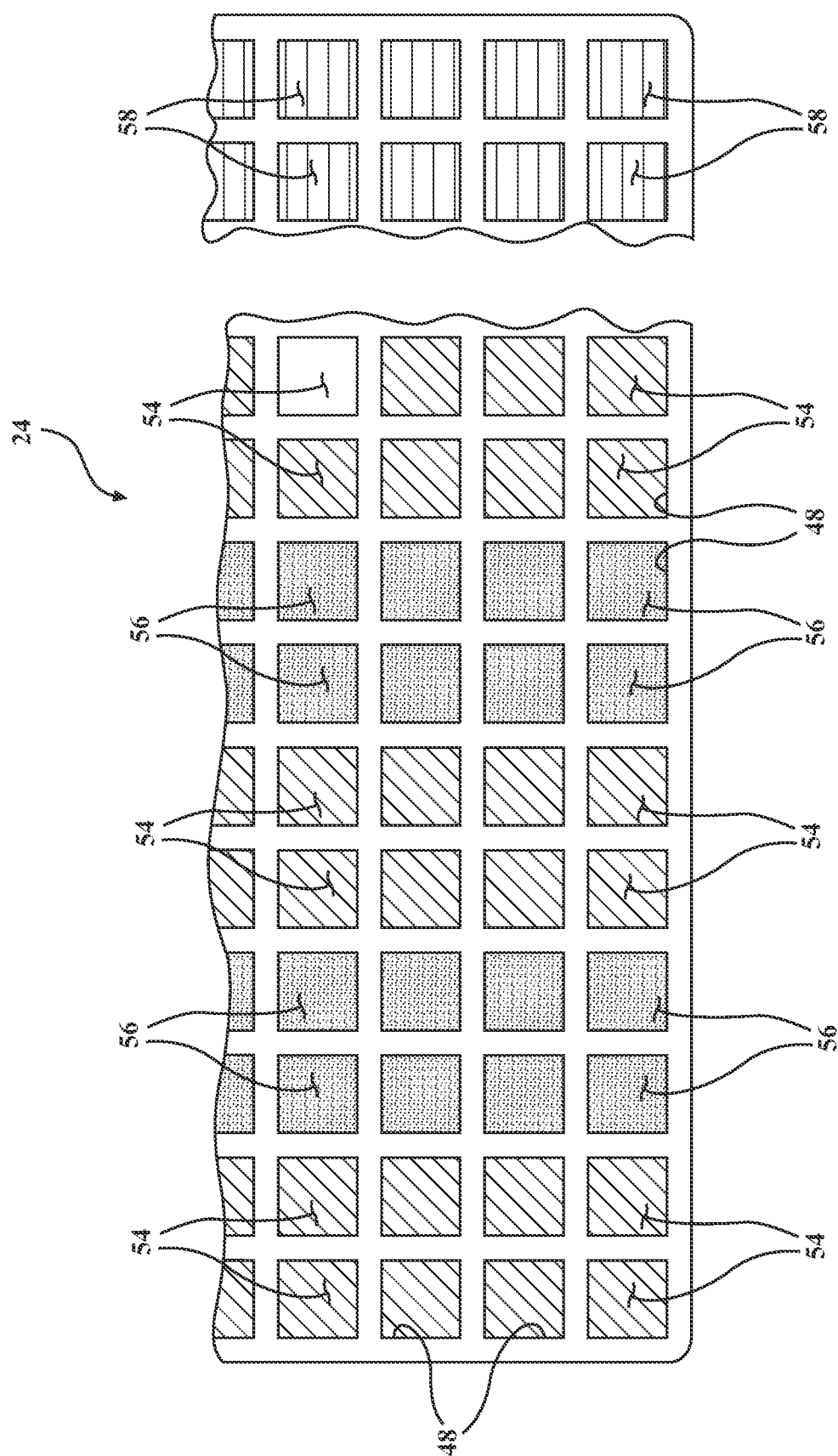
FIG. 5 is a fragmentary view of the test plate as taken generally along section line 5-5 in FIG. 4, which fill patterns showing certain wells containing reagents and other wells containing absorbent pads.

FIG. 5 is a fragmentary top view showing a portion of four rows of wells 48 along the bottom edge of the test plate 24, as taken generally along the section line 5-5 in FIG. 2. This view helps to illustrate the different roles, or jobs, that the wells 48 in any given sequence cluster are required to fulfill. There are at least three jobs that must be fulfilled by the wells 48 in any sequence cluster, and therefor at a minimum a sequence cluster must have at least three wells 48. It will be helpful to keep in mind that each row in this example contains two distinct sequence clusters that occupy alternating wells 48. And that for each sequence cluster of wells 48, one sensor unit 28 is dedicated. For these reasons, different types of wells 48 will appear in matched pairs—one well 48 for each sensor unit 28 in the two columns.

At least one well 48 in each sequence cluster comprises a sample reservoir 54, indicated in FIG. 5 by diagonal cross-hatch marks. A sample reservoir 54 is a well 48 that has a particular type of use or function. Not all wells 48 in a sequence cluster are sample reservoirs 54. In this example, three sets or pairs of sample reservoirs 54 are visible in the fragmented section of FIG. 5. The function or job of a sample reservoir 54 is to contain liquid reagents or analytes that are required to perform the desired diagnostic test. When the reactor section 36 of a sensor unit 28 is placed into a sample reservoir 54, the liquid reagents or analytes in that sample reservoir 54 are drawn up into the fluid duct 34 of the reactor section 36, either by capillary action or under the influence of a pressure differential or combination of both. A more detailed explanation of this procedure will be described below in connection with FIGS. 6A-D.

Figure 16:
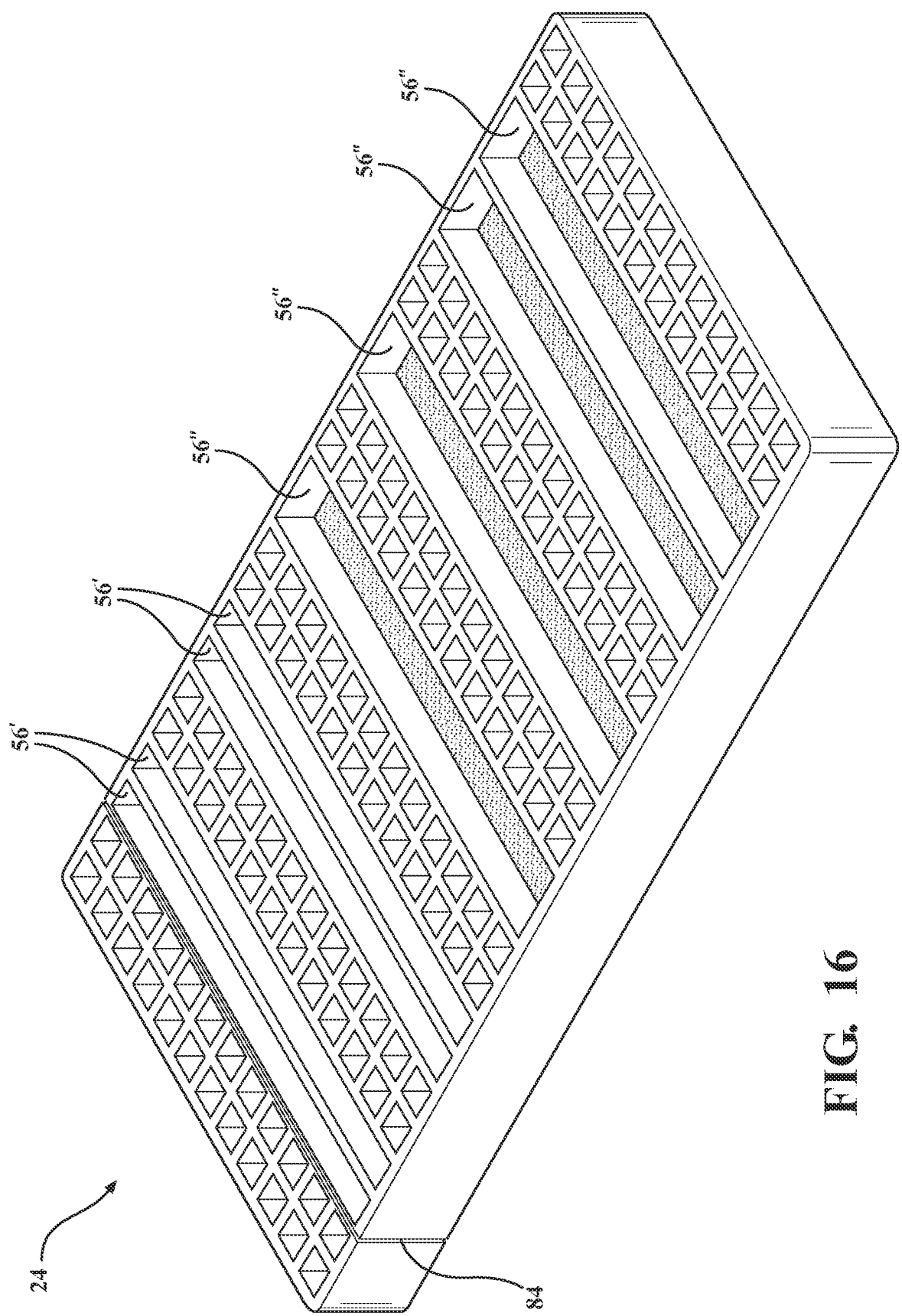
FIG. 16 shows an alternative embodiment of test plate having selectively merged/common drainage chambers.

Typically, the first well 48 in each sequence cluster will be used as a sample reservoir 54 specifically to hold a sample taken from a patient (or other source to be tested). As such, it may be useful to configure the test plate 24 so that the first, or at least one, sample reservoir 54 in a sequence cluster is detachable from the other wells 48 in that sequence cluster. In the example of a 12×24 test plate array 24 like that shown in FIG. 4, a person of ordinary skill in this art can envision the first two columns of wells 48 made separable from the remaining wells 48 of the test plate 24. Depending on the type of fixture used to support the test plate 24 in a diagnostic system 20 (e.g., FIG. 1), it may not even be necessary that the detachable columns of wells 24 be formally joinable or fastenable to the remainder of the test plate 24. In other words, the detachable column(s) of sample reservoir(s) 54 could be a permanently loose-piece component that is brought into proximity with the other wells 48 in the test plate 24 within the system 20 at the time of testing. In FIG. 16, the separable concept is illustrated via a separation line 84. Such an arrangement, where the sample reservoirs 54 used as a repository for the patient sample(s) are detachable from the remainder of the test plate 24, could make the system 20 more flexible and more convenient for users.

Another type of well 48 is drainage chamber 56. At least one well 48 in each sequence cluster will be a drainage chamber 56. Drain chambers 56 are dedicated to the drainage of liquid reagents/analytes from the reactor sections 36. Each drainage chamber 56 preferably includes an absorbent pad that is capable of wicking liquid reagent from a reactor section 36. Returning to the example of FIG. 5, two sets or pairs of drainage chamber 56 are seen, and can be identified by stippling, i.e., two drainage chambers 56 for each of the two sequence clusters visible in the fragmentary section of FIG. 5. In this view, there would very likely be at least one additional (but unseen) pair of drainage chambers 56 in each row to accommodate the third set of sample reservoirs 54. Preferably for purposes of motion economy, but not necessarily, one drainage chamber 56 will follow each sample reservoir 54 in a sequence cluster. One can therefore image that a reactor section 36 descends into a sample reservoir 54 to uptake liquid reagents or analytes, and then after a suitable incubation period moves to a nearby drainage chamber 56 so that its liquid contents can be emptied. Then on to another sample reservoir 54, incubation, another drainage chamber 56, and so on (uptake-incubate-drain) until the required number of steps has been completed. For this reason, one drainage chamber 56 will typically follow each sample reservoir 54 within any sequence cluster, and furthermore that the sample reservoirs 54 in each sequence cluster will tend to be disposed in alternating fashion with the drainage chambers 56, like this: 54-56-54-56-54-56 . . . .

As shown in FIG. 16, it may be possible in some applications to gang-together one or more drainage chambers in a common column. For example, reference number 56' illustrates how all twelve drainage chambers 56' in a single column can be merged. And in cases where the sensor array 22 has two (or more) columns of sensor units 28, adjacent columns can be merged into a large common drain chamber 56". Of course, many other variations of this idea are possible.

A third type of well 48 in each sequence cluster is a colorant reservoir 58. Each sequence cluster includes at least one, typically only one, colorant reservoir 58 at or near the end of the row. The purpose of the colorant reservoir is to contain a liquid color development reagent. After a sensor unit 28 has finished its prescribed course of uptake-incubate-drain events, its reactor section 36 is plunged into the dedicated colorant reservoir 58 in its sequence cluster. After a suitable period of time has been allotted for the color development reagent to have its effect, the sensor unit 28 moves to optical detection. After that, the sensor array 22 can be trashed with or without performing a final drainage step. In situations where a final drainage step is performed, either a fresh drainage chamber 56 or a previously-used drainage chamber 56 in the same sequence cluster can be used. (A previously-used drainage chamber 56 can be used because contamination will no longer be a significant concern at this stage.)

The test plate 24 can thus be viewed as an array of wells 48 for reagents/analytes and absorbent pads. The array format of the test plate 24 aligns with the format of sensor array 22 and has at least the same number of columns as the sensor array 22. The reagents/analytes (sample reservoirs 54) and absorbent pads (drainage chambers 56) are arranged alternately starting with the reagents/analytes. The type of reagents and sequence of various reagents can be determined and pre-programmed based on the analyte(s) to test and the type(s) of diagnostic protocol to perform. The last columns are designated for color development reagent.

Optionally, the wells 48 can be made as individual pieces, or column sub-sets, or row sub-sets, that are combined like building blocks to form a unitary structure of the desired size. The internal shape of each well 48 will be an outside offset of the outer shape of the reactor sections 36 so that a loose mated fit is achieved. The offset distance or clearance can, for example, be in the range of about 0.008 to 0.08 inches. The test plate 24 can be made any color with transparent, translucent, or opaque material. However, the preferred material is mechanically stable (not easily deformed) and inert to all anticipated reagents/analytes. The test plate 24 can be manufactured by injection molding if a plastic material (e.g., polypropylene) is chosen. Wells 48 can be manufactured all at once into a fully-formed test plate 24 or can be assembled by placing different components (e.g., rows or columns) together.

FIGS. 6A-D schematically illustrate the flow mechanism of reagents/analytes into and out of the reactor section 36 of a single optofluidic sensor unit 28 in the aforementioned uptake-incubate-drain course of events. For clarity, mating wells 48 are not shown in any of FIGS. 6A-D. It should again be mentioned that the leading tip of the reactor sections 36 are shown in an optional flat (non-tapered) configuration in these FIGS. 6A-D.

Figures 6A, 6B, 6C, 6D:
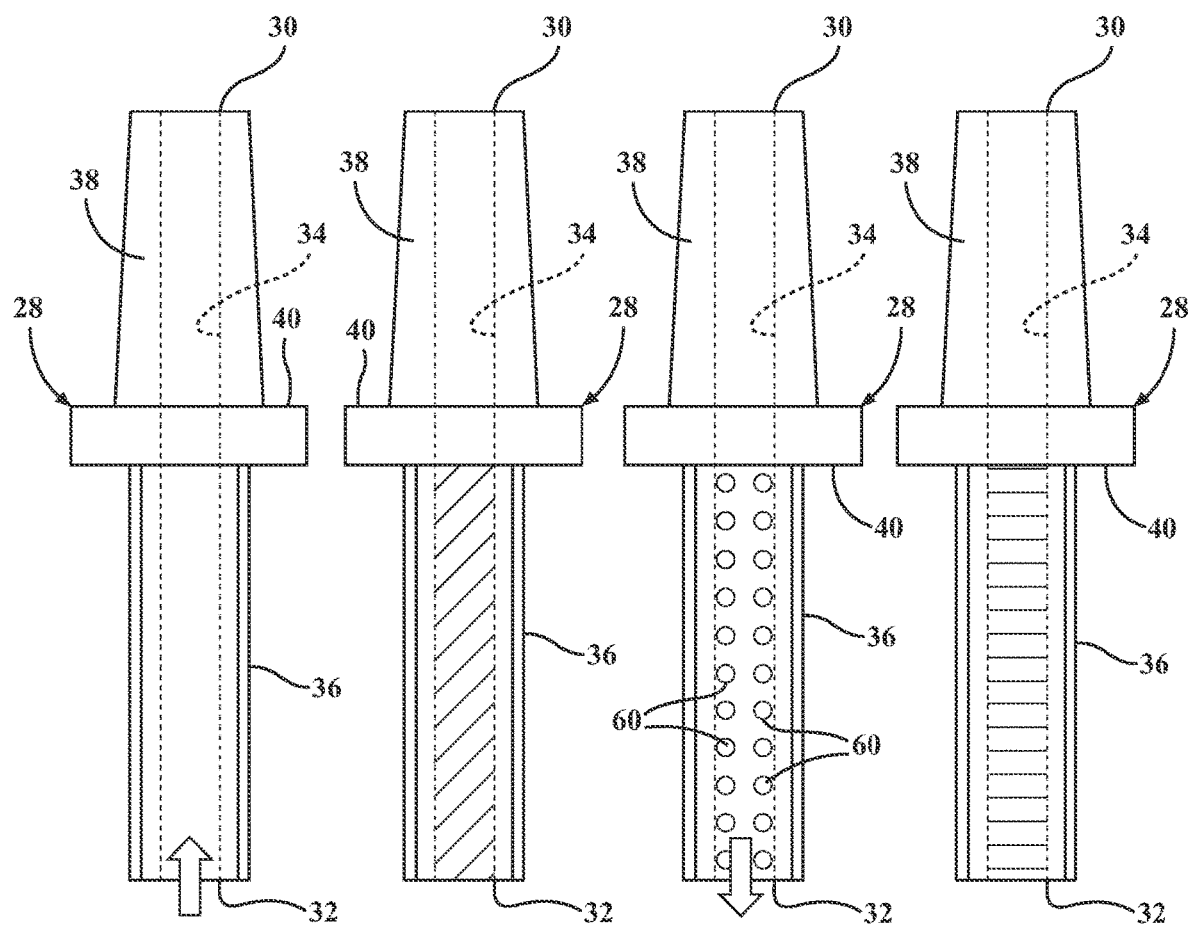
FIGS. 6A-D are front elevation views of a sensor unit depicted at progressive stages along the of steps in a diagnostic test carried out according to the principles of this invention.

FIG. 6A represents a reactor section 36 that is inserted or loaded into a well 48 configured to function as a sample reservoir 54. A directional arrow at the bottom end 32 of the fluid duct 34 shows the flow direction of the reagents/analytes at the open bottom end 32 of the single optofluidic sensor unit 28. When the reactor section 36 of the sensor unit 28 is immersed into a sample reservoir 54 containing a reagent/analyte solution, the solution flows up into the reactor section 36, because of the capillary force or because of a pressure differential induced at the top end 30 or combination of both. In one example, a pressure differential is accomplished by gently pulling a vacuum through a feed tube 46. This corresponds to the "uptake" part of the uptake-incubate-drain process.

FIG. 6B corresponds to the "incubate" part of the uptake-incubate-drain subroutine. The solution drawn into the reactor section 36 is incubated in the fluid duct 34 for a certain amount of time to allow the interaction between the solution and reactive coating agent A (FIGS. 9 and 10) pre-applied to the interior hollow surface within the reactor section 36. Or as mentioned previously, the reactive coating agent A could alternatively be immobilized using the system 20 of this invention in a pre-test preparation phase.

FIG. 6C portrays the "drain" part of the uptake-incubate-drain cycle. After incubation, the solution contained within the reactor section 36 is drained out through the bottom end 32, as indicated by the downwardly-pointing directional arrow. Typically, the solution is wicked away using an absorbent pad located inside a drainage chamber 56, or alternatively using a pressure differential induced through the top end 30 of the fluid duct 34 or combination of both. In one example, a pressure differential is accomplished by gently pushing air through a feed tube 46. After draining the solution, biochemical molecules 60 (FIGS. 9 and 10) are attached on the hollow surface within the reactor section 36. The processes of injecting the solution (FIG. 6A), incubating the solution (FIG. 6B), and draining the solution (FIG. 6C) can be repeated sequentially as per requirements of the diagnostic protocol.

In the last step associated with the test plate 24, portrayed in FIG. 6D, the reactor section 36 of the optofluidic sensor unit 28 is immersed into color development reagent held in a colorant reservoir 58 located at or near the last columns of the test plate 24. Via capillary action or pressure-assist or combination of both, the color development reagent colorant fills the reactor section 36 and then is subsequently drained after a suitable incubation period or remains inside sensor unit 28 after a suitable incubation period. Some protocols require that the colorant does not need to be drained out. For example, in chemiluminescence measurement, the color development reagent remains inside the reactor section 36. The colorant prepares the biochemical molecules 60 for optical detection. The processes of coloring the biochemical molecules 60 can be repeated as per requirements of the diagnostic protocol.

Figure 7:
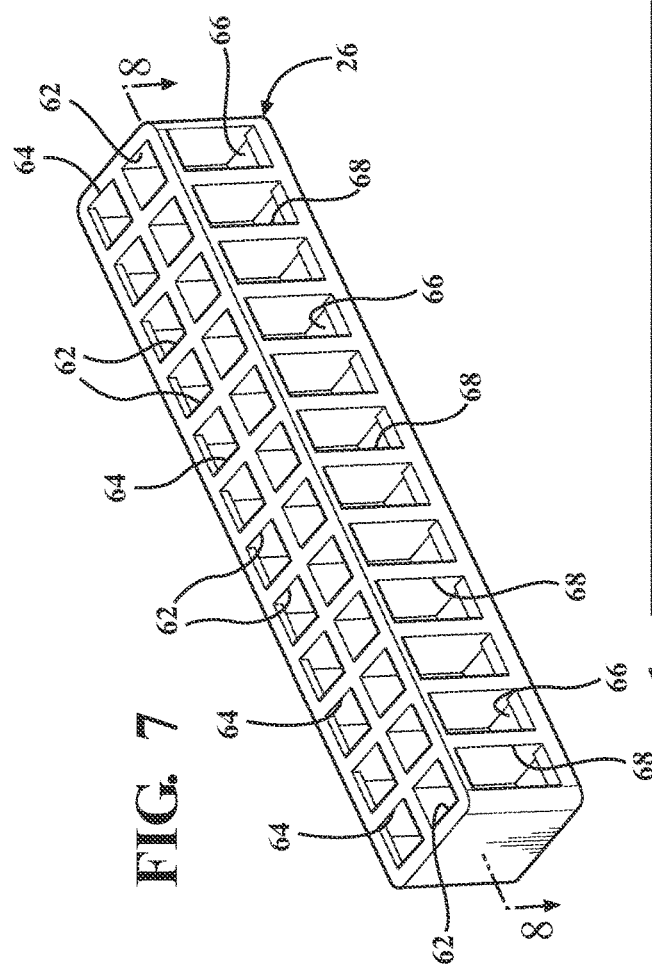
FIG. 7 is a perspective view of an optical detection cartridge according to an embodiment of this invention.

After that, the fully prepared sensor unit 28 is ready for optical detection. To facilitate the optical detection process, the system 20 of this invention may, optionally, include an optical detection cartridge 26. Perhaps best seen in FIGS. 7-9, the optical detection cartridge 26 includes a plurality of light confinement isolation booths 62. The number and arrangement of isolation booths 62 correspond to the number and arrangement of sensor units 28. That is to say, the array format of the optical detection cartridge 26 must be capable of aligning with the format of the sensor array 22, and therefore it is desirable that the detection cartridge 26 have the same number of columns as the sensor array 22. Each isolation booth 62 has a booth height defined by an open ceiling 64 and a closed floor 66. Within the cartridge 26, each isolation booth 62 will typically have the same, i.e., generally equal, booth height. Each isolation booth 62 is characterized by having an open viewport 68 surrounded by optically-opaque sides. Similar to the loose mating fit between sensor array 22 and test plate 24, the fit between the sensor array 22 and the optical detection cartridge 26 must also be of a somewhat slack male-female relationship. The internal shape of each isolation booth 62 will be an outside offset of the outer shape of the reactor sections 36 so that the desired loose mated fit is achieved. The offset distance or clearance can, for example, be in the range of about 0.008 to 0.08 inches.

Figure 9:
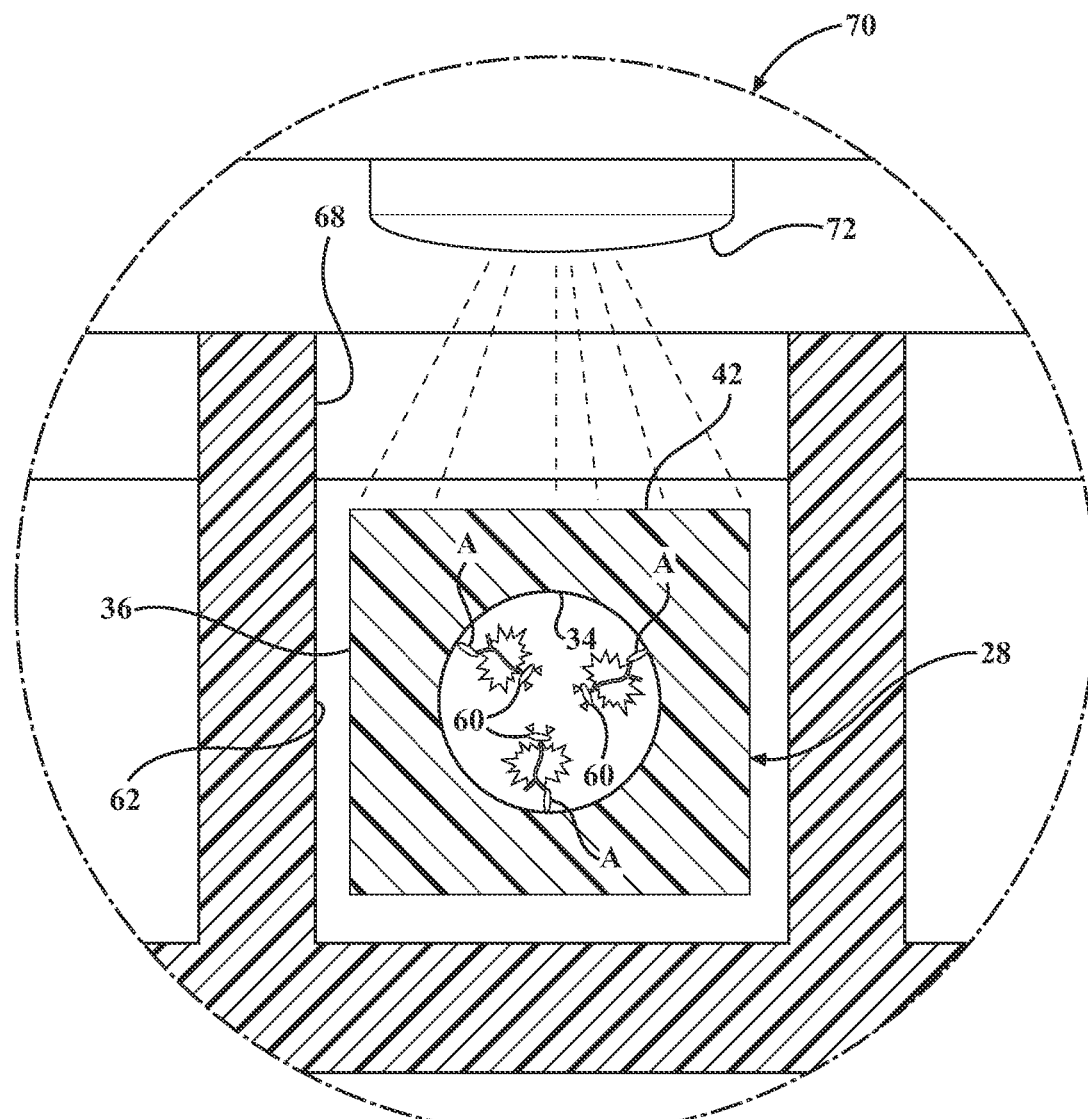
FIG. 9 is an enlarged view of an isolation booth in the optical detection cartridge taken from the circumscribed area indicated at 9 in FIG. 8, and further showing a cross-sectional view of the reactor section of a sensor unit disposed therein for color detection of biochemical molecules affixed to the inner surfaces thereof.
Figure 10:
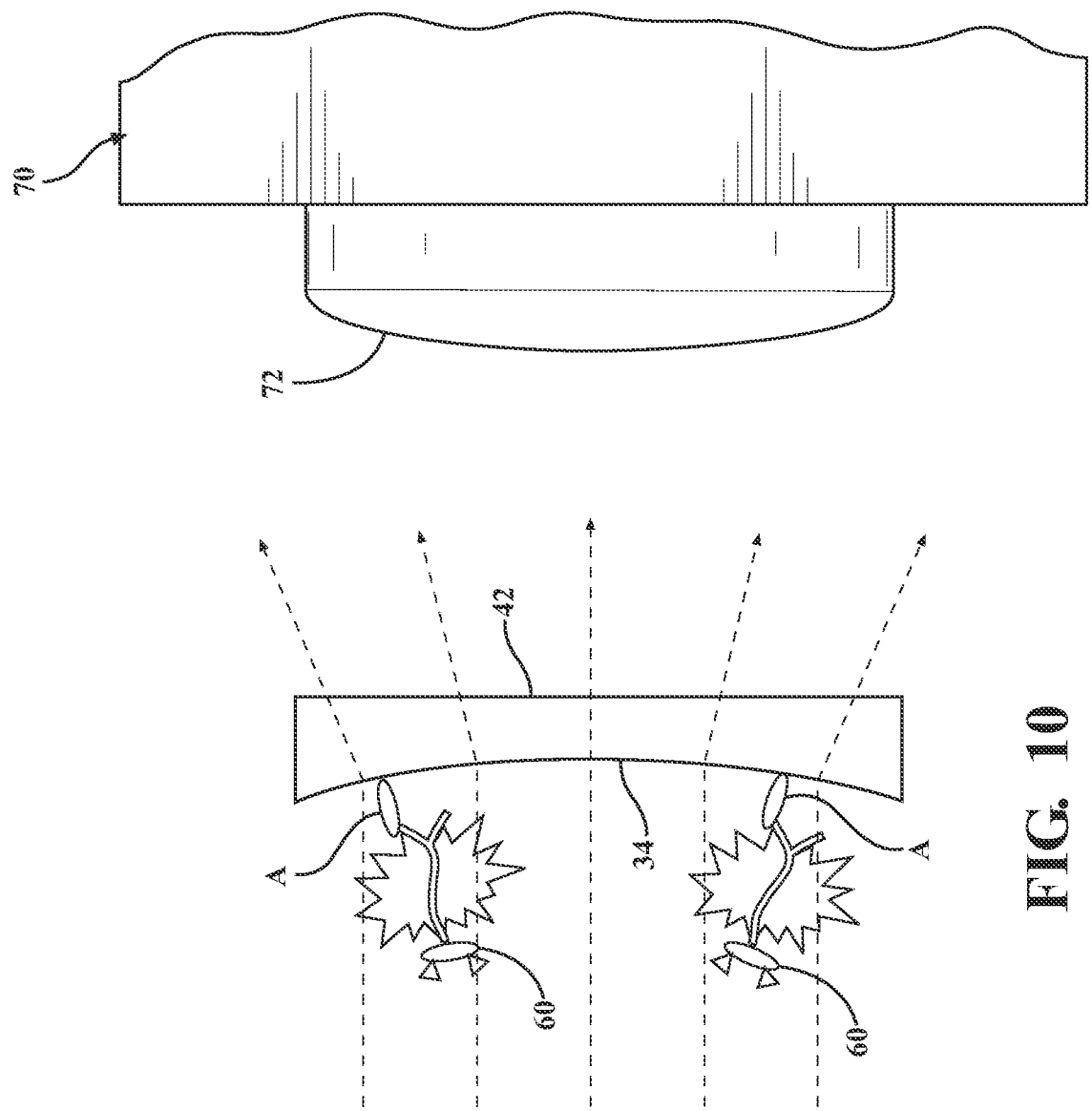
FIG. 10 is a highly simplified schematic view showing the manner in which the reactor section of a sensor unit forms a beneficially diverging lens curvature that has the ability to amplify optical properties and improve detection performance.

Each isolation booth 62 is adapted to receive therein a respective reactor section 36, so that the observation face 42 of the reactor section 36 is oriented toward the viewport 68. In particular, each isolation booth 62 is configured to receive the reactor section 36 of a sensor unit 28 through its open ceiling 64. When fully inserted, the observation face 42 of the reactor section 36 is exposed, i.e., visible, through the viewport 68, as shown in FIG. 9. In this manner, the observation face 42 is presented for optical detection. To avoid optical cross talk, the optical detection cartridge 26 is made with an opaque (preferably black) and mechanically stable material. The optical detection cartridge 26 can be manufactured by injection molding if a plastic material (e.g., back opaque polystyrene) is chosen.

Figure 8:
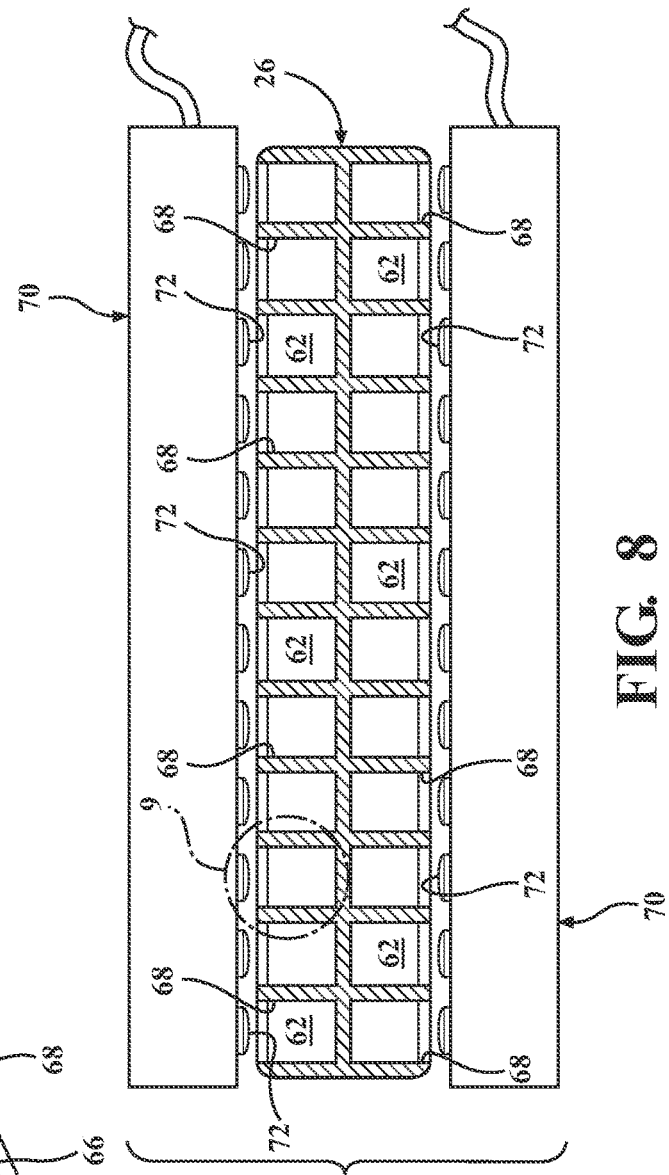
FIG. 8 is a cross-sectional view of the optical detection cartridge as taken generally along section line 8-8 in FIG. 7, and further showing optical detectors flanking both sides of the optical detection cartridge.

An optical detector 70 has at least one (typically only one) detection lens 72 associated with each isolation booth 62. In the example of FIGS. 8 and 11, two optical detectors 70 are provided, each having twelve lenses 72. One optical detector 70 is provided for capturing the optical conditions of the sensor units located along the first (left-hand) column of the sensor array 22. Conversely, the other optical detector 70 is provided for capturing the optical conditions of the sensor units located along the second (right-hand) column of the sensor array 22. Each detection lens 72 of the optical detector 70 is arranged opposite the viewport 68 of a respective the isolation booth 62 or is otherwise moveable into such a position. Of course, another possible variation is that a single optical detector 70 is configured with only one lens 72 for recording optical signals from all twelve sensor units 28, either sequentially or concurrently or one snapshot using large field of view lens. Whether plural or singular detection lenses 72 are employed, the opaque detection cartridge 26 makes optical cross-talk preventable among individual optofluidic sensor units 28, thus enabling improved accuracy in chemiluminescence or fluorescence detection schemes if desired.

By fashioning the observation face 42 as a flat planar surface oriented orthogonally toward the lens 72, an ideal imaging condition is established with which to acquire a uniform, relatively evenly distributed optical color representation of the biochemical molecules 60. As previously mentioned, the cross-sectional thickness of optically transmissive material directly behind the observation face 42 may be configured in the form of a plano-concave lens as shown by the cross-sections in FIGS. 9 and 10. Plano-concave lens are naturally divergent, which has the benefit of helping to spread the color-affected light across the observation face 42, thus increasing the efficiency, sensitivity and effectiveness of the optical detector 70.

FIG. 11 illustrates the relative movement of the sensor array 22 over the test plate 24 and finally to the optical detection cartridge 26. As also described in the legend provided with FIG. 11, solid arrows 74 represent relative moving directions of the sensor array 22 into sample reservoirs 54 containing liquid reagents. Evenly dotted arrows 76 represent relative moving directions of the sensor array 22 from sample reservoirs 54 into drainage chambers 56. Typically, an absorbent pad will be located at the base of each drainage chamber 56. This process may be repeated through multiple sample reservoirs 54 based on the required diagnostic protocol. A dot-dash arrow 78 represents relative movement of the sensor array 22 into the color development reagent contained with the final colorant reservoirs 58. Optionally, not shown, the sensor array 22 may be drained after incubating in the color development reagent. Evenly dashed arrow 80 represents final movement of the sensor array 22 into the optical detection cartridge 26, where the isolation booths 62 confining light contamination between the sensor units 28 (i.e., undesirable optical cross-talk). Optical detectors 70 are poised to take readings from each observation face 42, which reading are transmitted to an appropriate computerized processing device (not shown) for analysis and reporting.

FIG. 1 demonstrates, in simplified fashion, an exemplary automated optofluidic diagnostics system 20 combining the three main assembled components: the sensor array 22, the test plate 24, and the optical detection cartridge 26. A suitable transfer mechanism 82 is operatively disposed between the sensor array 22 and the test plate 24 and the optical detection cartridge 26 for moving the sensor array 22 relative to the test plate 24 and the optical detection cartridge 26 in response to a pre-programmed pattern. In this example, the sensor array 22 is gripped by a robotic arm attached to a stepper or servo motor. Feed tubes 46 connect to computer-controlled pressure differential device(s). The robotic arm can be moved vertically using the motor, while the entire module of the robotic arm, the feed tubes 46, the motor and sensor array 22 can be moved horizontally using another stepper motor. In this example, the test plate 24 and the optical detection cartridge 26 are fixed on a stationary fixture. For simplicity the optical detectors 70 are not shown in FIG. 1 but could of course be mounted on flanking sides of the optical detection cartridge 26 on the fixture as in FIG. 11, or else supported on a separate robotic arm and moved into position when needed. All these parts and modules may be enclosed in an enclosure. A touch screen user access interface (not shown) connected to a suitable microcontroller can be located at any convenient location on or around the enclosure.

In other contemplated embodiments, a robotic arm moves the plate 24 while the sensor array 22 remains stationary.

Naturally, FIG. 1 represents but a simple desk-top configuration of the system 20. Those of skill in the art will readily appreciate that the system 20 described herein can be scaled-up to include other parts such as automated sample additions to the test plate 24, stacking modules for automated insertions, automated ejections and automated re-loadings of sensor arrays 22, test plates 24 and/or optical detection cartridges 26. Likewise, the system 20 could also be scaled-down to a partially or fully manual process with only one or a small number of sensor units 28 processed at a time.

Figure 12:
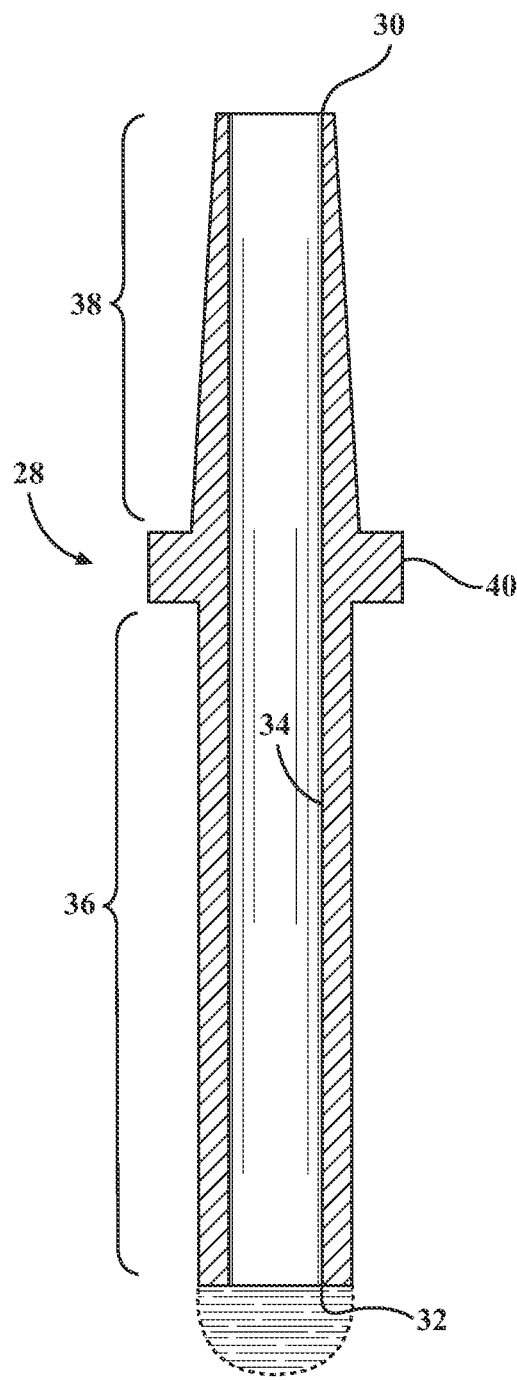
FIG. 12 is a cross-section view of a flat-tipped sensor unit like that in FIG. 6A with a relatively large droplet of reagent solution hanging therefrom.
Figure 13:
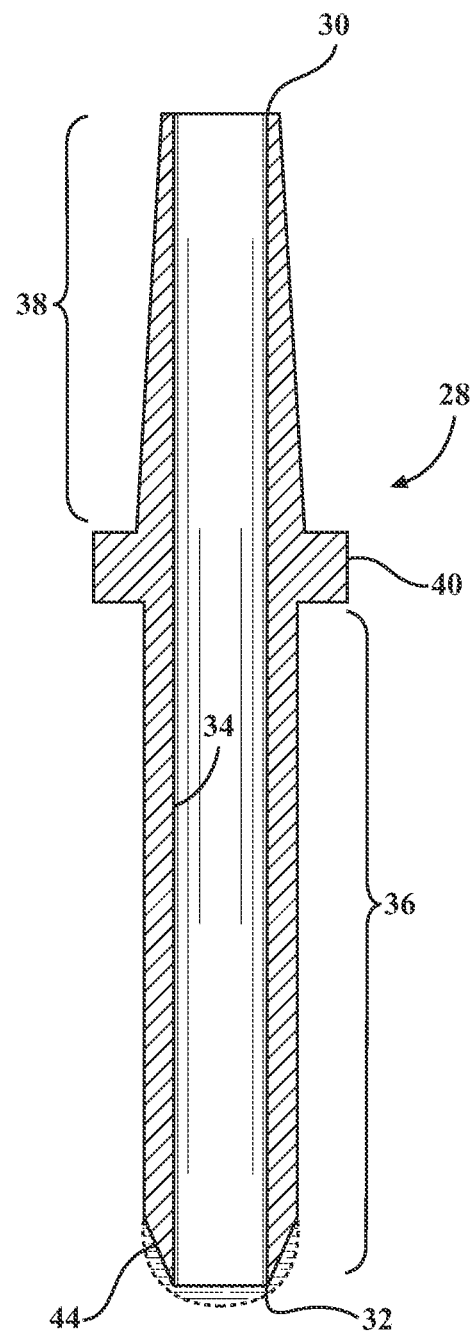
FIG. 13 compares with FIG. 12 by showing a cross-section view of a square to circle tapered lofted blend tip sensor unit like that in FIG. 2 and having relatively small droplet of reagent solution hanging therefrom.

As mentioned previously, the shape of the leading tip of the reactor section 36 can take different forms. Similarly, the shape of the base 52 of the wells 48, and in particular the bases 52 of the sample reservoirs 54, can also vary. In FIGS. 6A-D and 12, the leading tip is presented as a flat, squared-off shape. A flat tip is adequately functional within the system 20 but has one slight disadvantage—a flat tip naturally forms a relatively large hanging droplet of reagent solution as shown in FIG. 12. As the hanging droplet does not enter the fluid duct 34, it does not contribute to the diagnostic test and therefore represents an unproductive quantity of reagent solution. Often, the quantity of reagent solution may be limited, and it is necessary to economize usage. Comparing FIGS. 12 and 13, it can be seen that a larger droplet size of reagent solution (as collected from a sample reservoir 54 or colorant reservoir 58) will be greater for the flat tip than for the conical tip. Thus, in some applications it may be preferable to form the leading tips 44 of the reactor sections 36 with a generally frustoconical converging shape like that exemplified in FIGS. 2, 3 and 13 which naturally forms a relatively small hanging droplet of reagent solution.

Further economies can be achieved by optimizing the shape of the base 52 of each well 48, or at least those wells 48 serving as sample reservoirs 54, to closely match a conical leading tip 44. FIG. 14 depicts a flat tipped reactor section 36 like that of FIG. 12. The base 52 of the well 48 in this example is matched with a complementary flat shape. As a result of these mating flat shapes and exacerbated by the relatively large size hanging drop carried by the flat leading tip of its reactor section 36, a pronounced meniscus is formed by the molecules of the liquid that are attracted to climb the container walls. The quantity of unproductive solution would be even worse if the base 52 were to have a conical shape while the leading tip of the reactor section 36 remained flat. However, the situation can be vastly improved by tapering the base 52 with a complementary conical shape to the tapered leading tip 44 of the reactor section 36 as shown in FIG. 15. The shaded area shows a minimum amount of solution required for capillary uptake in this case. For maximum efficiency, the base 52 has a diverging square-to-round shape that exactly complements the generally frustoconical converging shape of the leading tip 44 of the reactor section 36. In other words, the lofted boss square-to-round shape of the leading tip 44 is matched by the lofted cut square-to-round shape of the base 52, resulting is a very small quantity of unproductive reagent solution being trapped at the interface. Consequently, the minimum amount of reagent solution will be required for capillary uptake when both the leading tip 44 and base 52 have matched conical configurations like that shown in FIG. 15.

The present invention describes a complete automated optofluidic diagnostic system 20 and accompanying methods designed for rapid analyte detections without using a conventional microplate reader or conventional well-plate. The system 20 comprises three independently usable components: an optofluidic sensor array 22, a test plate 24 having pre-populated sample reservoirs 54 and drainage chamber 56, and an optical detection cartridge 26. In one embodiment described, the sensor array 22 is attachable to and detachable from a robotic arm with two degrees of freedom, movable vertically and horizontally, while the test plate 24 and optical detection cartridge 26 are residing at stationary positions. In addition, the system 20 is able to integrate the user's desired optical detection module (e.g., chemiluminescence, fluorescence, etc.) with or without the stacking modules for high-throughput testing. The envisioned overall system 20 volume can be designed to occupy less than 1 cubic foot, making it conveniently portable. The user is able to access and control the system 20, while also being able to see the status of the system via a touch screen interface (not shown).

The alternative 12×24 matrix test plate 24 shown in FIG. 16 illustrates an optional set-up in which the first two columns of sample reservoir(s) 54 are formed as a loose-piece component that is brought into proximity with the other wells 48 in the test plate 24 along a separation line 84. This type of an arrangement makes it convenient for the initial column(s) of sample reservoirs 54 to be used for patient sample gathering. As such, it is potentially beneficial that these leading columns be disconnected, at least initially, from remainder of the test plate 24.

While a portable system 20 (i.e., smaller than 1 cubic foot) may be desirable for many users, in other contemplated embodiments the system 20 can be scaled up to include other parts such as automated sample additions to the test plate 24, and stacking modules of automated insertion, ejection, and re-loading of sensor array 22, test plate 24, and optical detection cartridge 26 to name but a few.

The system 20 has many advantages, including: (1) It does not require bulky standard well plate readers as with the prior art; (2) It does not require adding reagents manually; (3) The optionally small diameter of the optofluidic sensor improves analyte capture efficiency, and reduces assay time that allows for rapid diagnosis; (4) The optofluidic design with two open ends allows for addition and withdrawal of the analytes (solution) which uses capillary force or pressure differential induced by external device(s) or combination of both; (5) Predefined and prepopulated reagents in the reagents/analytes reservoirs and absorbent pads provide efficient means for reagents/analytes delivery and draining; (6) An opaque light confinement cartridge 26 makes optical cross-talk preventable among individual optofluidic sensor units 28. Therefore, chemiluminescence or fluorescence detection schemes can be adopted; (7) It can be deployed at bedside of patients, doctors' offices, and in space-limited laboratories due to the optional compact-size of the system 20; (8) It facilitates high-throughput screening due to the nature of the automated system. These as well as other advantages will become apparent to those of skill in this art through the following description and accompanying illustrations.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A multi-well test plate for an optofluidic diagnostic system, the multi-well plate configured to interact with at least one sensor unit, the at least one sensor unit configured to move sequentially into and out of registry with the multi-well test plate, said multi-well test plate comprising:
at least a first, second and third well each having a well depth defined by an upper mouth and a lower base, the at least first, second and third well arranged in a sequence cluster wherein the first well comprises a sample reservoir for containing a liquid analyte reagent, the second well comprises a drainage chamber configured to drain liquid reagents from the at least one sensor unit, and the third well comprises a colorant reservoir for containing a liquid color development reagent;

the at least one sensor unit comprising:

a top end, a bottom end spaced vertically from said top end, a fluid duct extending continuously from said top end to said bottom end, a reactor section adjacent said bottom end, said fluid duct including an reactive coating agent immobilized over at least a portion of the fluid duct in said reactor section, the reactor section adapted to enter the at least first, second and third wells through the respective upper mouth thereof, the reactor section comprising a planar observation face wherein at least a portion of said planar observation face comprises an optically transmissive material, the at least one sensor unit further comprising a generally plano-concave lens disposed at a portion of said reactor section between said duct and said observation face.

2. The multi-well test plate of claim 1, further including a plurality of said first wells and a corresponding plurality of said second wells, said plurality of said first wells disposed in alternating fashion with said plurality of said second wells.

3. The multi-well test plate of claim 1, wherein the at least first well, second well and third well have a generally square inner geometric shape.

4. The multi-well test plate of claim 1, wherein said drainage chamber includes an absorbent pad.

5. The multi-well test plate of claim 1, wherein the at least first, second and third well are arranged in a linear array, and wherein at least the first well is detachable from the second well or the third well or from a combination thereof in said sequence cluster along a separation line.

6. The multi-well test plate of claim 1, wherein said lower base of each said first well and second well and third well has a concave square-to-round shape.

7. The multi-well test plate of claim 6, wherein said reactor section has a leading tip shaped with a square-to-round convex conical transition that compliments said lower base of said first well and said second well and said third well.

8. The multi-well test plate of claim 1, wherein said fluid duct is generally cylindrical.

9. The multi-well test plate of claim 1, wherein said reactor section has a generally square outer geometric shape.

10. The multi-well test plate of claim 1, wherein said sensor unit includes a coupler section adjacent said top end, said coupler section comprising a conically-tapered exterior surface centered about said fluid duct.

* * * * *